US009571982B2

(12) United States Patent
Smith

(10) Patent No.: US 9,571,982 B2
(45) Date of Patent: Feb. 14, 2017

(54) SYSTEM AND METHOD FOR DYNAMICALLY PROVIDING REAL-TIME SERVICE FOR A MOBILE WIRELESS DEVICE

(71) Applicant: Software AG, Darmstadt (DE)

(72) Inventor: Gareth Smith, Waterbeach (GB)

(73) Assignee: Software AG, Darmstadt (DE)

( * ) Notice: Subject to any disclaimer, the term of this patent is extended or adjusted under 35 U.S.C. 154(b) by 84 days.

(21) Appl. No.: 14/464,292

(22) Filed: Aug. 20, 2014

(65) Prior Publication Data

US 2016/0057639 A1  Feb. 25, 2016

(51) Int. Cl.
*H04W 4/02* (2009.01)
*H04W 24/10* (2009.01)
*H04W 64/00* (2009.01)

(52) U.S. Cl.
CPC ............. *H04W 4/028* (2013.01); *H04W 24/10* (2013.01); *H04W 64/003* (2013.01)

(58) Field of Classification Search
None
See application file for complete search history.

(56) References Cited

U.S. PATENT DOCUMENTS

| 8,533,293 | B1 | 9/2013 | Sivasubramanian et al. |
| 8,627,013 | B2 | 1/2014 | Musumeci et al. |
| 2006/0268336 | A1* | 11/2006 | Sakaniwa ............. H04L 1/0045 358/1.15 |
| 2010/0323687 | A1* | 12/2010 | Richter ................. H04W 24/04 455/424 |
| 2011/0191781 | A1* | 8/2011 | Karanam .................. G06F 9/50 718/104 |
| 2012/0149388 | A1* | 6/2012 | West ......................... G01S 5/00 455/456.1 |
| 2014/0222570 | A1* | 8/2014 | Devolites ........... G06Q 30/0261 705/14.58 |
| 2014/0247806 | A1* | 9/2014 | Fujimoto ............ H04W 64/006 370/331 |
| 2015/0049602 | A1* | 2/2015 | Gavita .................. H04W 4/028 370/229 |

FOREIGN PATENT DOCUMENTS

| WO | 00/55769 | A2 | 9/2000 |
| WO | 01/48661 | A2 | 7/2001 |

* cited by examiner

*Primary Examiner* — Daniel Lai
(74) *Attorney, Agent, or Firm* — Posz Law Group, PLC

(57) ABSTRACT

A method and system is disclosed for providing continued of streaming content to a mobile device in a distributed wireless network. This includes receiving user location data; receiving user movement history data; receiving user profile data; determining a predicted coverage area based on the user location data and at least one of: the user movement history data and the user profile data; receiving static coverage data for the predicted coverage area; receiving dynamic signal data for the predicted coverage area; determining a predicted probability of network failure in the predicted coverage area based on the static coverage data and the dynamic signal data; determining if the predicted probability exceeds a set threshold value; retrieving desirable data for the predicted coverage area if the predicted probability exceeds a threshold; and storing the desirable data in a computer memory in the mobile device if the predicted probability exceeds the threshold.

17 Claims, 7 Drawing Sheets

SYSTEM AND METHOD FOR DYNAMICALLY PROVIDING REAL-TIME SERVICE FOR A MOBILE WIRELESS DEVICE

TECHNICAL FIELD

The technical field relates in general to processes for providing continued content to a mobile device in a distributed wireless network.

BACKGROUND

Many users of mobile electronic devices such as smart phones, tablet computers, portable computers, satellite radios, vehicle navigation systems, etc., use streaming services (e.g., movies, music, etc.), periodic downloading of data (e.g., map data), or location and profile triggering services that deliver offers and promotions in the context of mobile e-commerce.

In the case of e-commerce, customers have an application (commonly referred to as an "App") on their smart phone sourced from a physical (i.e., brick and mortar) store, and have registered for location-based offers from that retailer and/or vendor. For example, a user might download an application for a bookstore and join that bookstore's loyalty club in order to get special offers. The bookstore, through its loyalty program, will be aware of the user's purchasing habits, and will be able to predict possible future purchases. The bookstore can then instruct its application to provide the user with a special, time-limited offer for a book it believes the user might wish to buy when the user gets within a certain distance of a physical store. If, for example, the user has bought several books in a series, the bookstore may wish to offer the user a discount on the next book in the series. Such customized and real-time offers deliver value and benefits to customers and drive revenue and boost customer loyalty for the retailers.

However, mobile networks are not always reliable and may not deliver a continuous, uninterrupted service. This can be for reasons of congestion or geographic limitations and signal coverage, particularly in rural areas. As a result, a consumer may suffer a network failure, depriving her of streaming communication with a central server, and therefore the information about what offers are available for her current geographic area. This can cause both the consumer and the retailer to suffer from a lost opportunity.

SUMMARY

Accordingly, one or more embodiments provide a method, system and/or non-transitory computer readable medium for dynamically providing real-time service for a mobile device in a distributed wireless network.

Accordingly, an embodiment provides a method for dynamically providing real-time service for a mobile device in a distributed wireless network, including: receiving user location data; receiving user movement history data; receiving user profile data; determining a predicted coverage area based on the user location data and at least one of: the user movement history data and the user profile data; receiving static coverage data for the predicted coverage area; receiving dynamic signal data for the predicted coverage area; determining a predicted probability of network failure in the predicted coverage area based on the static coverage data and the dynamic signal data; determining if the predicted probability exceeds a set threshold value; retrieving desirable data for the predicted coverage area if the predicted probability exceeds a set threshold value; and storing the desirable data in a computer memory in the mobile device if the predicted probability exceeds the set threshold value.

In another embodiment a size of data packages sent to the mobile device is determined based on the predicted probability of network failure.

According to another embodiment, the method further includes determining a network failure trend value in the predicted coverage area, the network failure trend value indicating a movement trend of the predicted probability over time.

According to yet another embodiment, the user profile information includes one or more pieces of location data and day/time data associated with each of the one or more pieces of location data.

According to another embodiment, the dynamic signal data includes at least one of: a current signal strength measurement for the mobile device, a bandwidth measurement for the mobile device, current signal strength measurements for one or more nearby users in the predicted coverage zone, and current bandwidth measurements for the one or more nearby users.

According to still another embodiment, the operation of determining the predicted coverage area includes: obtaining a future time interval; determining a predicted future direction of the mobile device during the future time interval based on the user movement history data; determining a predicted future location of the mobile device after the future time interval has elapsed based on the user location data, the user movement history data, the predicted future direction, the future time interval, and the user profile data; determining a radius of uncertainty around the predicted future location based on the user movement history data and the future time interval; and identifying the predicted coverage area based on the user location data, the predicted future location, the radius of uncertainty.

According to another embodiment, the user movement history data includes a previous average direction the mobile device moved over a previous time interval, a previous average speed of the mobile device over the previous time interval, and the previous direction volatility of the mobile device over the previous time interval, and the operation of determining a predicted future location includes: identifying an initial future location based on the future time interval, the previous average direction, the previous average speed, and the direction volatility of the mobile device; and modifying the initial future location to obtain the predicted future location based on the user profile data.

According to another embodiment, the method further includes periodically repeating the operations of receiving user location data, receiving user movement history data, receiving user profile data, determining a predicted coverage area, receiving static coverage data, receiving dynamic signal data, determining a predicted probability of network failure, determining if the predicted probability exceeds a set threshold value, retrieving desirable data, and storing the desirable data.

An embodiment provides a system for dynamically providing real-time service for a mobile device in a distributed wireless network, including: a memory; and a processor cooperatively operable with the memory, and configured to, based on instructions stored in the memory, receive user location data; receive user movement history data; receive user profile data; determine a predicted coverage area based on the user location data and at least one of: the user movement history data and the user profile data; receive static coverage data for the predicted coverage area; receive dynamic signal data for the predicted coverage area; determine a predicted probability of network failure in the predicted coverage area based on the static coverage data and the dynamic signal data; determine if the predicted probability exceeds a set threshold value; retrieve desirable data for the predicted coverage area if the predicted probability exceeds a set threshold value; and store the desirable data in the memory if the predicted probability exceeds the set threshold value.

According to another embodiment, a size of data packages sent to the mobile device is determined based on the predicted probability of network failure.

Yet another embodiment provides that the user profile data information includes one or more pieces of location data and day/time data associated with each of the one or more pieces of location data.

According to another embodiment, the dynamic signal data includes at least one of: a current signal strength measurement for the mobile device, a bandwidth measurement for the mobile device, current signal strength measurements for one or more nearby users in the predicted coverage zone, and current bandwidth measurements for the one or more nearby users.

According to yet another embodiment, during the operation of determining the predicted coverage area, the processor is further configured to: obtain a future time interval; determine a predicted future direction of the mobile device during the future time interval based on the user movement history data; determine a predicted future location of the mobile device after the future time interval has elapsed based on the user location data, the user movement history data, the predicted future direction, the future time interval, and the user profile data; determine a radius of uncertainty around the predicted future location based on the user movement history data and the future time interval; and identify the predicted coverage area based on the user location data, the predicted future location, the radius of uncertainty.

Yet another embodiment provides that the user movement history data includes a previous average direction the mobile device moved over a previous time interval, a previous average speed of the mobile device over the previous time interval, and the previous direction volatility of the mobile device over the previous time interval, during the operation of determining the predicted future location, the processor is further configured to: identify an initial future location based on the future time interval, the previous average direction, the previous average speed, and the direction volatility of the mobile device; and modify the initial future location to obtain the predicted future location based on the user profile data.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. Introduction

Figure 1:
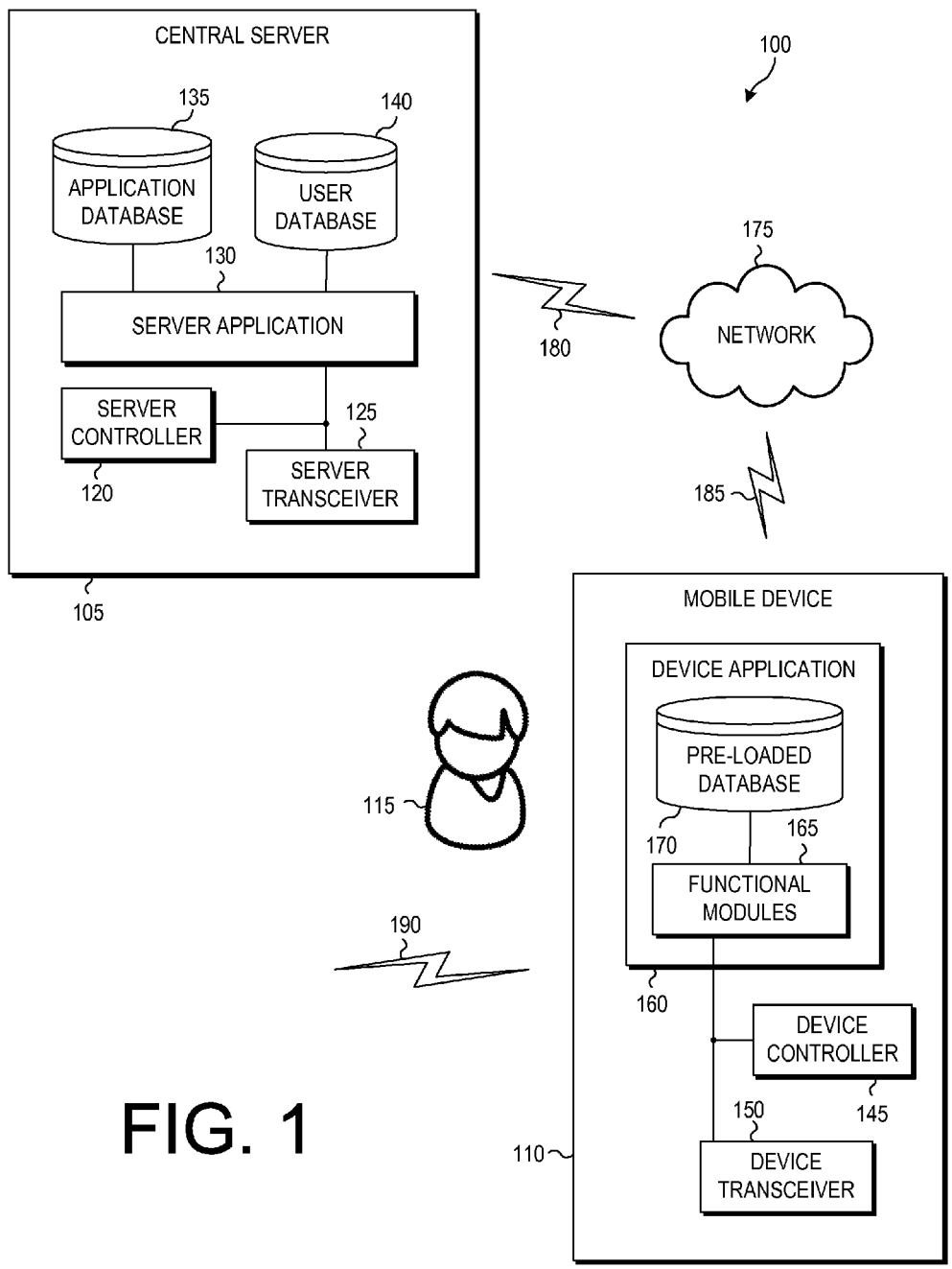
FIG. 1 is a block diagram of a distributed wireless network according to disclosed embodiments.

In overview, the present disclosure concerns a system and method for providing continued content to a mobile device in a distributed wireless network. More particularly, various inventive concepts and principles are embodiments in methods, devices, and/or systems related to ensuring that a mobile device has the content it needs, even in situations in which its network connection fails. In order to accomplish this, the manner of supplying and storing data in a mobile device may be controlled. By intelligently and dynamically pre-loading a subset of application data to a mobile device, the system ensures that mobile services continue to work correctly, even if there is no network coverage at the time.

In particular, a dynamic way can be provided to determine when extra data should be sent to a mobile device, how much data should be sent, and in what size packages it should be sent. A predicted coverage area may be dynamically determined that predicts where the mobile device will be at a future time. A prediction of available bandwidth to the user, as well as a probability of network failure, may be dynamically determined for a given predicted coverage area. The parameters regarding data transfer to the mobile device may be determined based on the predicted coverage area and the predicted available bandwidth/probability of network failure.

Discussed herein is a system and method for providing continued seamless content to a mobile device in a distributed wireless network, and example implementations that are useful with a variety of mobile devices, which may be located in different wireless networks. In particular example, the disclosed system and method can be used to ensure a constant flow of up-to-date e-commerce data to a mobile device, such as a mobile telephone or a tablet computer, can be used to provide uninterrupted streaming audio/video data to a mobile telephone, a mobile PC, or a smart phone, can be used to provide uninterrupted map data to a navigation system in a vehicle, a mobile telephone, or a tablet computer, or can be used to provide uninterrupted streaming audio data to a satellite radio.

According to embodiments herein, the system and method can be applied to a variety of applications, such as e-commerce applications, streaming audio/video applications, navigational applications, or any application that requires a continuing supply of new data. These applications can be on a variety of mobile devices, such as mobile telephones, car navigation systems, tablet computers, portable personal computers, satellite radios, watches, or the like.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

One or more embodiments discussed herein can address the aforementioned problems with traditional systems, by providing a built-in process to predict when a mobile device is likely to have a network outage, and to load the data that the mobile device might need while suffering that network outage prior to the outage. The system and method for providing continued up-to-date content to the mobile device increases the likelihood that when a device does suffer a network failure, it will already have stored the data that it needs from a server to provide uninterrupted service to a user. This material will improve the experience of the user, and may make the network outage unnoticeable in cases in which the network connection is regained before the stored material runs out.

II. Problem Presentation

Current systems and methods for operating mobile devices in a distributed wireless network do not address the concept of pre-loading data to a mobile device based on a real-time dynamic prediction of the area in which the mobile device is likely to be, the actual bandwidth available to the mobile device, and the likelihood that network communication will be interrupted within a certain period of time. Furthermore, they do not address the concept of modifying the predicted coverage area based on user data.

Although data caching, in general, is known, conventional techniques to not address this dynamic, real-time approach for selecting the data to be cached. As a result existing systems have a much greater risk that the wrong data will be stored in a local memory. In such case, even though some data is cached, the user will still suffer an interruption in service because the stored data is not the data required for continued operation.

For example, WO 2001048661 A2 discloses an electronic commerce system and method, which is a general ecommerce system as in the context of advertising; this only speaks about statically pre-loading web pages (not offers) and is likened to TV usage and not location based.

U.S. Pat. No. 8,627,013 B2, for methods and systems for caching data using behavioural event correlations, discloses generic caching behaviours. It does claim that it "relates to using of a behavioral event correlation system to make predictions regarding entries that are to be populated in a cache." This is in the context of selecting and defining cache behavior. This does not relate specifically to eCommerce and offers in the context of location based activity.

U.S. Pat. No. 8,533,293 B1, regarding client side cache management, discloses a generic pre-loading system for data caching As an example of "pre-loading" content generally, refer to WO 2000055769 A2, concerning a method and system for pre-loading internet content.

These techniques do not sufficiently address the problems addressed herein.

III. Overview and Aspects of the Approach

In the present distributed network, individual mobile devices operate in conjunction with a central server. Typically, the mobile devices will engage in periodic communication with the central server, exchanging system data required to maintain the current and future connections, as well as application data that is used by one or more applications on the mobile devices. However, due to the nature of wireless communication, it is possible that any given mobile device will fall out of communication with the central server for a short or long period of time, leading to the possibility that an application on that mobile device will not be able to obtain the data it requires for operating the application.

In the present distributed network system, each mobile device will operate to periodically determine a predicted coverage area in which it is likely to be over a certain period of time, a probability that the mobile device will be disconnected from the network during that time, and a predicted bandwidth that will be available to the mobile device during that time. These calculations can be based on both static and dynamic information about the state of the network.

Based on the predicted coverage area and the probability of network failure, and application on the system will determine whether the mobile device needs to request additional data from the central server, how much data it must request, and what package size should be used to send the data to the mobile device. Based on the predicted coverage area, as well as known user data, the system determines precisely which data should be stored on the mobile device.

In this way, if there is a network failure, and the mobile device falls out of communication with the central server, there is a significant chance that the mobile device will have the data it needs for the area it is currently in, despite being disconnected from the central server. If the period of network failure is short enough, the user may even be unaware that a disruption in service occurred, since the application will proceed without interruption, even though the mobile device cannot receive data from the remote server. In such case, the system has predicted what data the mobile device will need, and has preloaded that data into a memory on the mobile device. This can increase the user experience of the operator of the mobile device.

Example of use cases include, without limitation:

A user is streaming video or music on their mobile device and over a mobile network. In current systems the music/video app will buffer a fixed amount of data to cover the expected (normal) irregularity of network availability. However, utilizing concepts herein, the music app can know when to expect an upcoming poor region of network availability and it can increase this buffer size automatically during these periods so than when the customer continues their path into the congested zone (and is in fact in receipt of none or almost no data) their streaming service still continues to run uninterrupted. This offers a seamless service to the end users regardless of network activity and short-term outages as they moved through the landscape.

A user is using a mobile device in their car as a satellite navigation system. The so-called "SatNav" app has a pre-computed route but the detailed maps shown on screen are incrementally downloaded. In current systems, when the user drives through an area of poor network availability, the maps will not be available and the SatNav system will fail or show a blank screen. With systems and methods according to the concepts herein, the SatNav system can know that the user is about to enter a region of poor network availability and can download additional regions of the map to cover the network limitation.

An example discussed herein is mobile eCommerce for brevity. Mobile eCommerce systems will match offers to subscribers based on their location, profile and history. These are most commonly implemented as an App running on the subscriber's mobile smart phone that communicates with one or more remote servers. The process normally is described as:

1. Customer subscribes with the Vendor or Retailer, providing profile information and downloads their app to their smartphone.
2. When walking around commercial centers the App reports the location of the phone to the remote servers.
3. When the remote servers detect not only that the customer is within the bounds of a know location but also that their profile and history all match that required for an offer to be dispatched then the offer can be "pushed" to that customer's smart phone for immediate display.
   a. The offer can be dispatched with a unique OfferID that is used during the checkout process in the specific store (for example, small unique sequence of characters, a QR code, a Bar Code, and the like).
4. The customer can then decide to take that Offer ID and the item (or items) under offer to the checkout of that (nearby) specific store.

For this process to work, steps 2, 3 and 4 use continually available network connectivity as it is the remote servers that define the logic and matching.

Concepts discussed herein, and methods and systems according to these concepts, overcome these problems that occur when network connectivity is unreliable or weak/unavailable, by intelligently deciding on which offers are most likely to be relevant in the near term future for each customer and migrating the executing logic between the remote server and the customer's App based on network connectivity.

There are two main aspects:

1. Predicting the set of possible offers and when they are needed. Here we are concerned with working out what the complete set of possible ecommerce scenarios could be, and relating this to a measured computation of network reliability to know when we need to pre-load them. This is further split into two aspects:
   1. When pre-loading of offers is required. This component can determine when there is need to pre-load offers for each individual customer.
   2. Defining the working set of possible future offers. Based on the probability of requiring to run off-line, the App or the Server will decide whether to pre-load possible future offers for this customer or not, and what these are.
2. Executing the offer matching logic within the App. Now that there is delivered (and pre-loaded) a set of possible ecommerce offers, the system can decide what to do with them and how they are executed. This is split into two aspects:
   1. Offer Matching. The App on the customer's smart phone now contains a selection of the possible offers that can be presented to the customer. It must now decide when to present a pre-loaded offer to a customer (and at the correct time), if at all.
   2. Offer Execution. When a suitable offer is shown to that Customer. and they decide to execute it within the retailer, the information presented to the Customer (which is then passed to the retailer) must be valid and deliver the expected offer (for example, a discount).

FIG. 1 illustrates a distributed wireless network 100 according to disclosed embodiments. As shown in FIG. 1, the wireless network 100 includes a central server 105 and a mobile device 110 used by an operator 115. The central server 105 includes a server controller 120, a server transceiver 125, a server application 130, application database 135, and a user database 140. The mobile device 110 includes a device controller 145, a device transceiver 150, and a device application 160. The device application includes functional modules 165 and pre-loaded database 170. The central server 105 communicates with a network 175 via signals 180, while the mobile device 110 communicates with the network 175 via signals 185. The mobile device 110 also receives location data via signals 190.

The server controller 120 functions to control the operation of the central server 105. This includes data manipulation, data transmission, and data reception.

The server transceiver 125 functions to transmit and receive the signals 180 passing to between the network 175 and the central server 105.

The server application 130 functions to set forth the parameters by which the server controller 120 controls the operation of the central server 105.

The application database 135 contains application data needed by the device application 160 to perform its intended function. For example, if the device application 160 is an e-commerce application, the application data may be a list of potential offers and promotions along with the locations associated with those offers and promotions, and the parameters for when they should be offered, and to whom; if the device application 160 is an audio/video streaming application, the application data may be the audio/video data required to play the desired audio/video content; and if the device application 160 is a navigational application, the application data may be the map data required for the operation of the navigational application.

The user database 140 includes information about the user 115. This information can include user profile data and user movement history data. User profile data can include information such as the age of the user 115, the sex of the user 115, the approximate income of the user 115, where the user 115 lives, where the user 115 works, what loyalty programs the user 115 belongs to, where the user 115 has previously shopped, what products the user 115 has previously bought, what products the user 115 has looked at on the Internet, etc. User movement history data can include locations that the user 115 frequents, as well as date/time information when the user has been in those areas. For example, if the user 115 goes to a particular shop every Saturday morning, the prior location data can indicate the location of the shop and date/time information regarding when the user 115 has been at that location. Likewise, if the user 115 always drives to/from work along the same route, the prior location data can indicate points along that route as well as date/time information indicating when the user 115 is likely to be at those locations.

The device controller 145 functions to control the operation of the mobile device 110. This includes data manipulation, data transmission, and data reception.

The device transceiver 150 functions to transmit and receive the signals 185 passing between the network 175 and the remote device 110.

The device application 160 operates to perform a set function on the mobile device 110. For example, the device application 160 could be an e-commerce application for a business (e.g., a loyalty program application), a streaming audio/video application (e.g., an Internet radio application), a navigational application (e.g., a mapping program), or the like. In exemplary embodiments, the device application requires a continual or periodic stream of information from the central server.

Typically, the total amount of data required by the device application 160 for operation is larger than the amount of memory on the mobile device 110 that the user 115 would like to allow the device application 160 to use, or is larger than the total memory available on the mobile device 110. As a result, the device application 160 operates using a subset of the total data, and continually or periodically receives updates from the central server 105, providing it with new data to be used. For example, in an e-commerce application the mobile device 110 stores a subset of possible offers and promotions that the user 115 might receive; in a streaming audio/video application, the mobile device 110 stores a subset of the total audio or video files that the user is listening to/watching; and in a navigation application, the mobile device 110 stores a subset of the total map data corresponding to the area in which the user 115 is currently located.

But, with each type of device application 160, circumstances can and will change, requiring the mobile device 110 to store different data. The user 115 may move to a different location, requiring different offers and promotions relating to the shops now near the mobile device 110; the user 115 will finish listening to/watching the current audio/video data held by the mobile device 110, and will need the next set of audio/video data to continue listening/watching; or the user 115 may move to a different location, requiring different map data for the new area. The disclosed system operates to predict what that required data will be.

The functional modules 165 operate to set forth the parameters by which the device controller 145 controls the operation of the mobile device 110 to provide the functions of the device application 160.

The pre-loaded database 170 in the device application 160 stores application data required for the operation of the device application 160. This pre-loaded database 170 obtains this application data from the application database 135 in the central server 105 via the network 175. As a result, even if there is an interruption in the signals 185 to/from the network 175, the device application can function for a time using the application data pre-loaded into the pre-loaded database 170.

The network 175 can be any wireless network, such as a cell phone network, or the like.

A. Mobile Device Applications

Figure 2:
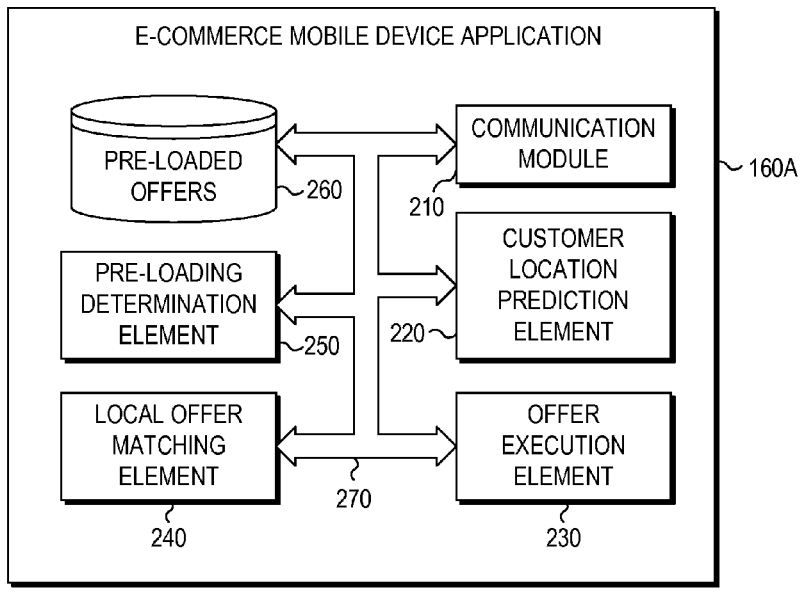
FIG. 2 is a block diagram of an e-commerce mobile device application according to disclosed embodiments.
Figure 3:
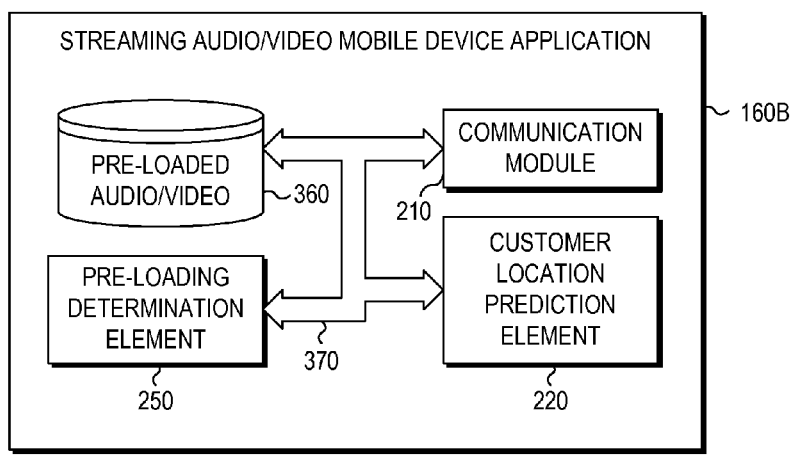
FIG. 3 is a block diagram of a streaming audio/video mobile device application according to disclosed embodiments.
Figure 4:
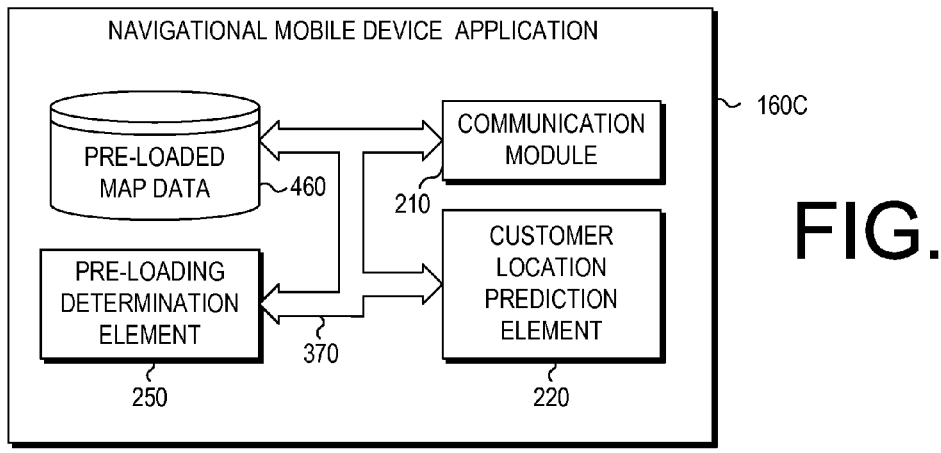
FIG. 4 is a block diagram of a navigational mobile device application according to disclosed embodiments.

FIGS. 2-4 are block diagrams of three different exemplary mobile device applications 160 according to disclosed embodiments. FIG. 2 illustrates an e-commerce mobile device application 160A, FIG. 3 illustrates a streaming audio/video mobile device application 160B, and FIG. 4 illustrates a navigational mobile device application 160C. Although each application performs a different function, each nevertheless requires a continual supply of data to function properly.

FIG. 2 is a block diagram of an e-commerce mobile device application 160A according to disclosed embodiments. The e-commerce mobile device application 160A operates to deliver offers and promotions to a user 115 via the mobile device 110. Often, these offers and promotions are real-time offers and promotions that are given when the customer is relatively close to a particular brick and mortar store, and have a limited duration. As a result, the data to be displayed to the user 115 can be dependent on the actual location of the user 115 at the time the offers or promotions are provided. Furthermore, as the user 115 moves, she leaves the vicinity of some stores and enters the vicinity of others. This makes information regarding offers and promotions from the old stores unneeded data, and requires the loading of information regarding offers and promotions from the new stores into the mobile device 110.

As shown in FIG. 2, the e-commerce mobile device application 160A includes a communication module 210, a customer location prediction element 220, an offer execution element 230, a local offer matching element 240, a pre-loading a determination element 250, a database of pre-loaded offers 260, and a data bus 270.

The communication module 210 includes all of the hardware and software necessary for the device application 160A to communicate with the network 175. It is the conduit through which the device application 160A will communicate with the central server 105. It will record when there is an active remote connection, what the current signal strength is, and it will manage the process of re-synchronizing the local data within the device application 160A and the master data set held by the central server 105 and vice versa.

The customer location prediction element 220 operates to determine a future location, and coverage area where the mobile device 110 will be after the passage of a given time interval. It does so based on data received from the central server 105 and location data received through signal 190.

The offer execution element 230 operates when a user is executing an offer. It provides information to a retailer/vendor based on an offer that is either received in real-time, or is pre-loaded into the database of pre-loaded offers 260.

The local offer matching element 240 operates to match the universe of potential offers with the location of the mobile device 110, to determine which offers are relevant to the user 115.

The pre-loading determination element 250 determines whether any data must be pre-loaded into the database of pre-loaded offers 260, if so what data and how much data must be pre-loaded into the database of pre-loaded offers 260, and at what size of data package to use for loading the data.

The database of pre-loaded offers 260 operates as a storage element for whatever data the pre-loading determination element 250 determines must be pre-loaded. The pre-loaded data in this embodiment includes a list of offers, times for those offers, locations for those offers, and criteria for assigning these offers to a user 115. The database of pre-loaded offers 260 is formed in a non-transitory computer memory.

The data bus 270 allows communication between all of the elements 210, 220, 230, 240, 250, 260 in the device application 160A.

FIG. 3 is a block diagram of a streaming audio/video mobile device application 160B according to disclosed embodiments. The streaming audio/video mobile device application 160B operates to deliver streaming audio/video to the user 115. This requires the mobile device 110 to receive a continuing stream of new audio/video data as old audio/video data is played. The data to be stored is not generally related to the location of the user 115, but the mobile device 110 continually requires new data, and so must have that data available at every location to which the user 115 travels.

As shown in FIG. 3, the streaming audio/video mobile device application 160B contains a communication module 210, a customer location prediction element 220, a pre-loading determination element 250, a database of pre-loaded audio/video data 360, and a data bus 370.

The communication module 210, the customer location prediction element 220, and the pre-loading determination element 250 operate as described above with respect to the e-commerce mobile device application 160A. A description of their operation will not be repeated here.

The database of pre-loaded audio/video data 360 contains the audio/video data that is currently needed by the mobile device 110 to play the audio/video, as well as the audio/video data that will be needed for a future period of time. The amount of time that the mobile device 110 can play audio/video using only the audio/video data stored in the database of pre-loaded audio/video data 360 depends largely upon the amount of audio/video data stored in the database of pre-loaded audio/video data 360. The more stored data, the longer the mobile device 110 can play audio/video. It is desirable that the amount of data pre-loaded into the database of pre-loaded audio/video data 360 be large enough to ensure a high probability of uninterrupted play, but as small as possible to increase device performance. The database of pre-loaded audio/video data 360 is formed in a non-transitory computer memory.

The data bus 370 operates similarly to the data bus 270 described above, allowing the communication module 210, the customer location production element 220, the pre-loading determination element 250, and the database of pre-loaded audio/video data 360 to communicate with each other.

FIG. 4 is a block diagram of a navigational mobile device application 160C according to disclosed embodiments. The navigational mobile device application 160C operates to display a map and provide directions to and information about nearby sites. As the user 115 moves, she may leave the area covered by the current map data and into an area covered by new map data. In such a situation, it is necessary for the new map data to be provided to the mobile device 110. Preferably, the need for new maps is predicted so that the new maps can be stored in the mobile device 110 before they are needed.

As shown in FIG. 4, the navigational mobile device application 160C includes a communication module 210, a customer location prediction element 220, a pre-loading determination element 250, a database of pre-loaded map data 460, and a data bus 370

The communication module 210, the customer location prediction element 220, the pre-loading determination element 250, and the data bus 370 operate as described above with respect to the e-commerce mobile device application 160A. A description of their operation will not be repeated.

The database of pre-loaded map data 460 contains all of the map data that the pre-loading determination element 250 has determined must be stored in the database of pre-loaded map data. This should include sufficient map data to allow the device application 160C to provide uninterrupted navigation advice and display, even if there is a brief network outage.

In each of these exemplary mobile device applications 160A, 160B, 160C, the data stored in the various databases 260, 360, 460 changes over time. Furthermore, in some of them the data changes depending upon the location of the mobile device 110 it is therefore desirable to make certain that, in the case of a network outage, sufficient data is stored in the relevant database 260, 360, 460, and that the right data is stored in the relevant database 260, 360, 460. Thus, it is helpful if the system can both predict, at least in general, where the mobile device 110 will be at any given time, and predict the likelihood of there being a network outage in that general area. This will allow it to know when to store additional data on the mobile device 110, and precisely which data will likely be needed by the mobile device.

Furthermore, total network outage is only one possible threat to the uninterrupted operation of a mobile device application 160. Another problem is that of reduced available bandwidth in the network at a given location. It may be that the user 115 moves to a location in which there is still some coverage, but at a bandwidth much lower than an average available bandwidth. In such case, while the mobile device 110 can still download some data, it may not be able to download the data fast enough to keep up with the needs of its mobile device application 160. For example, in the case of a streaming audio/video mobile device application 160B, the mobile device 110 may not be able to download sufficient data to keep the audio/video playing at a desired quality level, or at all. However, if the system can predict when such an attenuation of bandwidth will occur, it can pre-load sufficient data into the database of pre-loaded audio/video data 360, thereby allowing the streaming audio/video mobile device application 160B to continue providing uninterrupted play of audio/video, even though the mobile device 110 is in an area of reduced bandwidth.

In addition, it is generally more efficient for a network to send relatively large packages of data as compared to relatively small packages of data. This is because the overhead for sending those packages does not change significantly, but the payload does. However, the larger the data package used, the greater the penalty is for having to resend a failed data package. For this reason, many networks avoid using particularly large data packages. A brief network failure during the transmission of the data package can cause the entire package to be lost, requiring it to be resent.

But if the network had a reasonable certainty that it would not have a network failure for certain period of time, and would have sufficient bandwidth to transmit a relatively large package during that time, it could transmit the large package with much less risk of failure. Thus, by having a dynamic prediction of future available bandwidth, the system can more efficiently manage its network resources.

The three embodiments of FIGS. 2-4 are simply showed by way of example. Additional embodiments can include any application that requires a continual stream of data, or requires data associated with particular locations.

B. Determination of a Predicted Coverage Area

One aspect of predicting a probability of a future network outage that affects a mobile device 110 or the available bandwidth that a mobile device 110 will have a future time is predicting where precisely the mobile device 110 will be at that future time. Since it is impossible to predict an exact location, the disclosed system predicts a coverage area in which the mobile device 110 has a strong probability of being at a future point in time.

Customer Location Prediction

The system makes its prediction based on user movement history data and user profile data. The user movement history data may include:

the length of a prior interval of time $t_P$ used for measurement purposes, the current location of the mobile device 110, the average direction that the mobile device 110 has moved over the prior interval of time $t_P$, the average speed $S_A$ at which the mobile device 110 has moved over the prior interval of time $t_P$, the direction volatility DV of the mobile device 110 over the prior interval of time $t_P$, locations that the user 115 frequents, as well as date/time information when the mobile device 110 has been in those areas, and time difference, which is the time between the time now and the future point in time when the customer will be predicted to be, using the speed of the mobile device as a sensible measure, for example, time difference T:=100 (in m)/average speed $S_A$ (in m/s) as representing what time it will take the mobile device to move 100 m (e.g., for a user to walk 100 m).

The user profile data may include information such as the age of the user 115, the sex of the user 115, the approximate income of the user 115, where the user 115 lives, where the user 115 works, what loyalty programs the user 115 belongs to, where the user 115 has previously shopped, what products the user 115 has previously bought, what products the user 115 has looked at on the Internet, etc.

Figure 5:
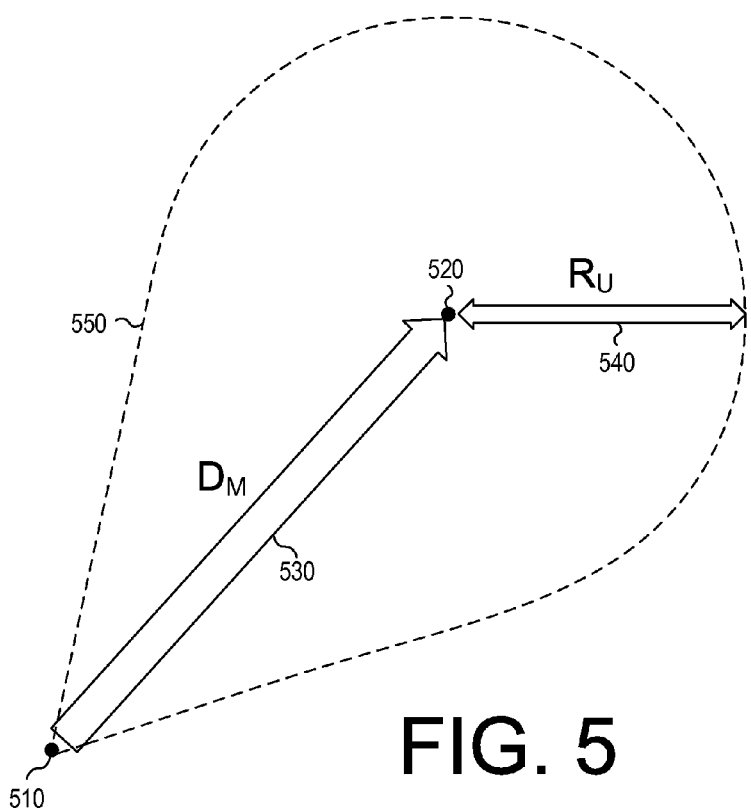
FIG. 5 is a diagram illustrating how a coverage area is predicted according to disclosed embodiments.

FIG. 5 is a diagram illustrating how a coverage area 550 is predicted according to disclosed embodiments. As shown in FIG. 5, the system begins with the device's current location as a starting location 510, and then determines a predicted ending location 520 where it predicts the mobile device 110 will be after the passage of a future interval of time $t_F$.

The system accomplishes this by generating a predicted movement vector 530 that indicates a predicted movement direction and a predicted movement distance $D_M$ from the starting point 510. The direction of the predicted movement vector 530 is the average direction the mobile device 110 has moved over the prior interval of time. The magnitude of the predicted movement vector 530, i.e., the predicted movement distance $D_M$, is equal to average speed $S_A$ at which the mobile device 110 has moved over the prior interval of time $t_P$ divided by the user's direction volatility DV over the prior interval time $t_F$:

$$D_M = \frac{S_A}{DV}. \quad (1)$$

Once the predicted ending location 520 is generated, the system then determines a radius of uncertainty $R_U$ 540 around that point. The radius of uncertainty $R_U$ 540 represents a predicted maximum distance that the user may be after the passage of the future interval of time $t_F$ based on her actual movement rather than her predicted movement. The radius of uncertainty $R_U$ 540 is calculated by multiplying the user's direction volatility DV by the future interval of time $t_F$:

$$R_U = DV \times t_F. \quad (2)$$

The radius of uncertainty $R_U$ 540 defines a circle whose center is at the predicted ending location 520. The system uses this circle as a predicted ending location for the user 115, and defines the predicted coverage area 550 as including the circle and the area defined by two lines originating from the starting location 510 and ending at points that are tangent to the circle. Thus, the predicted coverage area 550 is a teardrop shape whose point is at the starting location 510. The predicted coverage area 550 defines the area in which the system predicts the mobile device 110 will be during the course of the future time interval $t_F$.

In cases where the mobile device 110 has not moved for a significant period of time, a set minimum value for direction volatility DV can be provided to keep the predicted movement distance $D_M$ from being too large, and the radius of uncertainty $R_U$ from being too small.

The operation of determining the predicted coverage area 550 shown in FIG. 5 relies entirely upon the immediately prior movements of the user 115. In other words, the system predicts where the user 115 will go based on where she has moved and how she has moved in the past time interval $t_P$. However, it is also possible to take into account the aggregate movements of the user 115 over time, as well as the user profile data, to modify the predicted coverage area 550.

Figure 6:
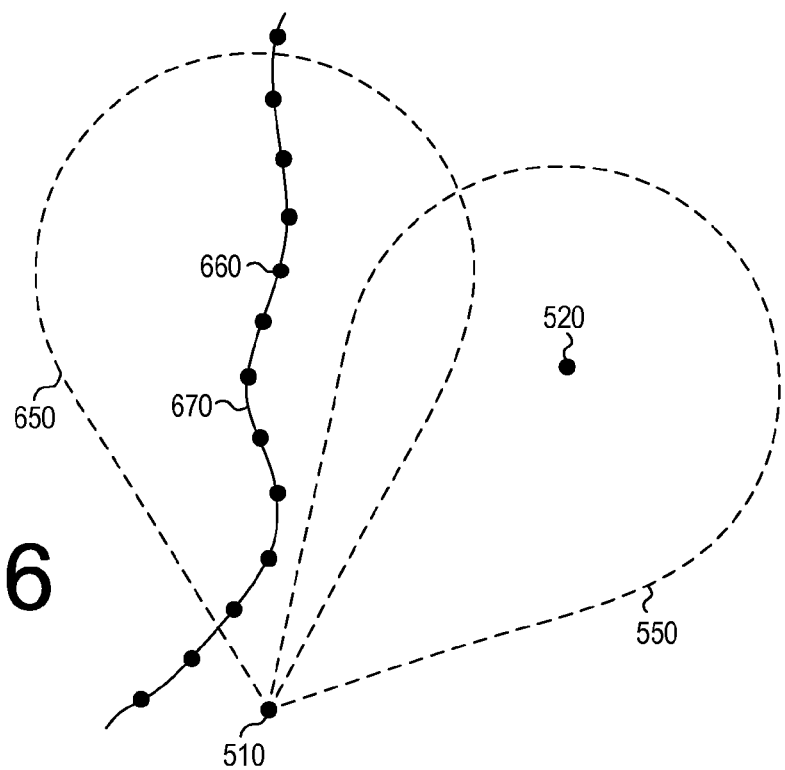
FIG. 6 is a diagram illustrating a first way that a predicted coverage area can be modified based on user profile data according to disclosed embodiments.

FIG. 6 is a diagram illustrating a first way that a predicted coverage area 550 can be modified based on user profile data according to disclosed embodiments. In these embodiments, the ending location 530 is replaced with the location of a point on a regular route taken by the user 115.

As shown in FIG. 6, the predicted coverage area 550 is calculated in the manner described above. However, in this case, the system sees from the user movement history data that the user 115 has frequently been in multiple nearby locations at a time generally corresponding to the current time. These multiple locations 660 form a route 670 that the system can monitor. For example, this route could represent the route home from work that the user 115 drives between 5 pm and 6 pm each weekday. Over time, system has observed this route 670 multiple times and has stored location information and date/time information for the multiple locations 660, as well as an indication of the frequency this route is taken. This information is stored in the user database 140 as user movement history data.

When the predicted coverage area 550 is determined, the system notes that the route 670 is nearby, and adjusts the predicted coverage area 550 to an adjusted predicted coverage area 650 that includes the route 670. Adjustment of the protected coverage area 550 can be achieved in numerous ways. FIG. 6 shows embodiments in which the adjusted predicted coverage area 650 is centered on the route 670. However, alternate embodiments could arrange the adjusted predicted coverage area 650 such that it was centered on a point between the predicted ending location 520 and the route 670.

Figure 7:
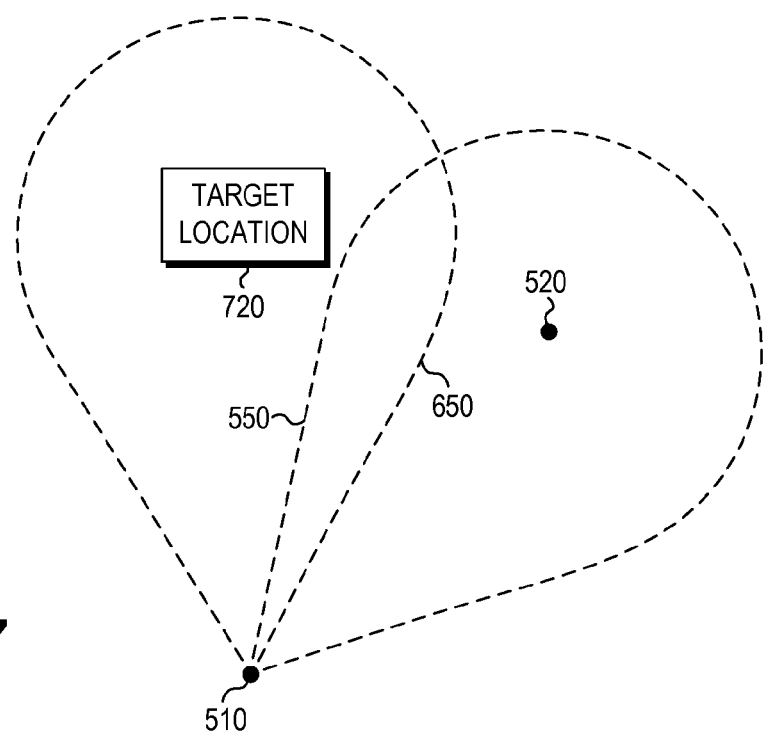
FIG. 7 is a diagram illustrating a second way that a predicted coverage area can be modified based on user profile data according to disclosed embodiments.

FIG. 7 is a diagram illustrating a second way that a predicted coverage area can be modified based on user profile data according to disclosed embodiments. As shown in FIG. 7, the predicted coverage area 550 is calculated in the manner disclosed above.

However, after the predicted coverage area 550 is determined, the system may note, from the prior movement data, that the user 115 has frequently been at a nearby target location 720 for an extended period of time that generally corresponds to the current time. For example, the target location 720 could represent a store that the user 115 shops at with some regularity. Over time, the system has observed the user's behavior and has stored as prior movement data in the user database 140, the location information for the target location 720, the date/time information regarding when the user was at the target location 720, and an indication of the frequency that the user is at the target location 720.

In the alternative, the system may note, from user profile data, that the user 115 has an existing relationship with a nearby target location 720. For example, the user 115 may be a member of a loyalty program for a store at the target location 720; the user 115 may have previously shopped at a store at the target location 720; or the user 115 may have indicated their preference for a store at the target location 720 on a social media application. In such case, the system may determine that the user 115 is more likely to head in the direction of the target location 720.

When the predicted coverage area 550 is determined, the system notes that the target location 720 is nearby, and adjusts the predicted coverage area 550 to an adjusted predicted coverage area 750 that includes the target area 720. Adjustment of the protected coverage area 550 can be achieved in numerous ways. FIG. 7 shows embodiments in which the adjusted predicted coverage area 750 is centered on the target location 720. However, alternate embodiments could arrange the adjusted predicted coverage area 750 such that it was centered on a point between the predicted ending location 520 and the target location 720.

In various embodiments described above, the future interval of time used to generate the predicted coverage area 550 can be a fixed time interval, or a changeable time interval.

C. Dynamic Determination of Network Coverage Probability and Predicted Bandwidth Once a predicted coverage area 550, 650, 750 has been determined, the system can then determine a probability of network outage in that coverage area 550. The system does this by considering both static system information and dynamic system information. The static system information can include pre-defined geospatial signal strength maps for different carriers, which indicates the quality of coverage in different geographic areas. The dynamic system information can include actual, real-time data regarding the signal strength and available bandwidth of the mobile device 110 and of other mobile devices connected to the network 175 that are within the predicted coverage area 550, 650, 750.

These sources can be combined to determine the probability of network being available, i.e. whether there will be a network outage. In the disclosed embodiments, this probability is a unary probabilistic number. Once this probability rises above a predefined probability threshold, the system can triggered the pre-loading of data into the mobile device 110. This probability threshold may be a fixed number, or it may vary over time or by circumstance.

It is also possible to simply enable pre-loading at all times. In this case, it is only necessary to set the predefined probability threshold at 0%. Since the probability of a network outage will always be greater than 0%, this will trigger at least some pre-loading behavior.

The system can also make a determination of the predicted bandwidth that the mobile device 110 should have available to it within the predicted coverage area 550, 650, 750. This predicted bandwidth can be used to determine whether it will be necessary to pre-load additional data into the mobile device 110 because there will be insufficient bandwidth for its needs when it travels into the predicted coverage area 550, 650, 750, as well as what size data packages can safely be sent during the future time period. As with the probability of network outage, the predicted bandwidth is determined based on static data sources and real-time, dynamic data sources.

Static Data Sources

The static system information can include pre-defined geospatial signal strength maps for different network providers, which indicate the quality of coverage in different geographic areas. These maps give a measure of the expected physical conductivity/strength within the network, and give a rough upper estimate of expected bandwidth availability. For example, if an area is known, through the signal strength maps, to have no more than 50% signal strength, then that area will likely yield no more than 50% of the normal available bandwidth. However, this network strength coverage map assumes no network congestion. As a result, it does not measure the actual bandwidth available, but only provides an upper estimate of the bandwidth available.

Real-Time (Dynamic) Data Sources

The dynamic data sources can provide a much more accurate measurement based on real-time streaming data. The dynamic system information can include actual, real-time data regarding the signal strength and available bandwidth of the mobile device 110 and of other mobile devices connected to the network 175 that are within the predicted coverage area 550, 650, 750. These dynamic data sources a discussed immediately below:

—Current User's Actual Signal Strength

The current user's actual signal strength is a measurement of the actual signal strength that the mobile device 110 of the user 115 is currently experiencing. As such, it is far more finely grained than the approximate values derived from the static maps. This measurement delivers the network strength at the specific location of the user 115, as well as at all of the locations at which the user 115 has previously been. This allows the system to derive an actual upper signal strength, and thus an upper bandwidth value, for the current location of the mobile device 110, as well as the historic locations for the mobile device 110.

—Current User's Actual Bandwidth Measurement

The current user's actual bandwidth measurement is a measurement of the actual bandwidth that the mobile device 110 of the user 115 is currently achieving. This measurement allows the system to derive a value that shows the actual data transmission bandwidth that the user 115 is experiencing. The current user's actual bandwidth may be determined in a number of different ways. For example, it may be computed by a plug-in into the kernel with in the devices mobile operating system, or by a function built into the operating system itself. Such a function will compute the incoming and outgoing bandwidth in terms of bits/second. These values will be moving average calculations over a short time period, typically a few seconds (e.g., 5-10 seconds). The current user's actual bandwidth may also be computed from within the device application 160 as it is continually sending and receiving data. As a result the device application 160 can calculate a value for the actual, average, upstream and downstream bandwidth for the mobile device 110 in its current location and at that current time.

—All Nearby Users Actual Signal Strengths—within Target Zone

The actual signal strengths of nearby are obtained in a similar manner to those of the mobile device 110. However, these measurements are aggregated for the selection of devices that are located within an area of interest (e.g., a radius around the user 115).

—All Nearby Users Actual Bandwidth Measurement within Target Zone

The actual bandwidth measurement of nearby users can be obtained in a similar manner to those of the mobile device 110. However, these measurements are aggregated for the selection of devices that are located within the area of interest.

With the above static and dynamic signal data, the system can build up a model that defines the percentage of bandwidth availability to the mobile device 110 in its current location, as well as a prediction of what the percentage of bandwidth availability will be for the mobile device in the predicted coverage area 550, 650, 750. A combination of these two values provides a value for a future expected bandwidth.

The value of the future expected bandwidth is important because the system will be calculating the network availability to download real-time information that must be received quickly. Furthermore in times of high congestion users will often experience zero or very low bandwidth, and thus data availability, even if the network strength is indicated as being at a maximum value.

In addition the system can look at the trend (i.e., gradient) of how the predicted bandwidth value moves to gain further insight into the possible future bandwidth. For example, a sharp decline in the available bandwidth at a particular location could indicate that there is a surge in network activity that may make the short-term future bandwidth lower than would otherwise be predicted. This is true even if the static map of the network area indicates no change in activity.

Probability of Coverage

Thus, one way to determine a probability of coverage $P_C$ in the predicted coverage area 550, 650, 750 is to calculate a current predicted coverage value $V_C$ and multiply it by the trend T of how the predicted coverage value $V_C$ is moving:

$$P_C = V_C \times T \times 100, \quad (3)$$

where $V_C$ and T are each probability values.

Latest Value Calculation

The current value $V_C$ provides a snapshot of the probability of the likelihood of network bandwidth for the mobile device 110 as it moves along its path. The current value $V_C$ can be determined by multiplying an active bandwidth indicator $I_{AB}$ by a static path indicator $P_S$ and an active path indicator $P_A$:

$$V_C = I_{AB} \times P_S \times P_A, \quad (4)$$

where $I_{AB}$, $P_S$, and $P_A$ are all probability values.

The active bandwidth indicator JAB is a value from 0.0 to 1.0 that is an average of the network bandwidth for the mobile device 110 of the user 115 and other mobile devices within a fixed size boundary (e.g., 20 m) around the mobile device 110. The active bandwidth indicator $I_{AB}$ can be determined by dividing a measured bandwidth $B_M$ by a maximum theoretical bandwidth $B_{MT}$:

$$I_{AB} = \frac{B_M}{B_{MT}}, \quad (5)$$

where $B_M$ and $B_{MT}$ are both in units of bits-per-second, and $B_{MT}$ is related to the type of network data connection that the mobile device 110 currently has access to (e.g., GPRS, EDGE, 3G, or 4G).

The static path indicator $P_S$ is a value from 0.0 to 1.0 indicating what the static network map suggests would be the likely maximum network coverage for the location of the mobile device 110. This value essentially defines the upper limit of network availability. Typically, the static path indicator PS is determined by reading it from a stored table based on information determined from the static network map. For example, the static network map might indicate good coverage, poor coverage, or no coverage, for indoors or outdoors situations. In this case, the static path indicator table might look as follows:

TABLE 1

Static Path Indicator Determination

| Coverage | $P_S$ |
|---|---|
| Good coverage, indoors | 1.0 |
| Good coverage, outdoors | 0.75 |
| Poor coverage, indoors | 0.5 |
| Poor coverage, outdoors | 0.25 |
| No coverage | 0.01 |

In this particular example, the value of $P_S$ for no coverage is given as 0.01, i.e. a small value, rather than 0.0 in order to provide a small chance of coverage in such a circumstance. However, alternate embodiments could use the value of 0.0 for no coverage.

The active path indicator $P_A$ is a value from 0.0 to 1.0 that is the calculated average actual network bandwidth for each mobile device within the predicted coverage area 550, 650, 750. For each of the mobile devices known to be in the predicted coverage area 550, 650, 750 the system calculates an active bandwidth $I_{AB}$ using equation (5). The active path indicator $P_A$ is an average of all of these active bandwidth values.

Trend Calculation

The trend T of how the predicted value is moving is a linear regression calculation that determines the gradient of the last N values of the active bandwidth $I_{AB}$. It determines whether or not there has been a severe change in the available bandwidth. The result of the linear regression, i.e., the orientation of the straight line that is used to approximate the rate of change in the value of the active bandwidth $I_{AB}$ values is between 1.0 (for a 100% vertical, increasing value) and −1.0 (for a 100% vertical, decreasing value), where 0.0 represents a flat, horizontal line. Typically there are only mild fluctuations in the bandwidth, and so the values for the trend T of how the predicted value is moving will rarely come close to either the extremes of 1.0 or −1.0. The returned trend T value is a derivative of a direct Linear Regression calculation algorithm:

LR:=Linear Regression(FIXED[last $n$ samples])

In one disclosed embodiment, the trend T can be determined based on the value of the linear regression calculation, such that when the linear regression LR is within certain ranges, a certain value will be selected for the trend T. For example, the value of trend T could be set as follows. If the linear regression LR is between a lower threshold and an upper threshold (e.g., −0.3 and +0.3), then the trend T will be set at 1.0, e.g., $$\text{If } -0.3 < LR < +0.3, \text{ then } T = 1.0. \quad (6)$$

In this case, there is a mild gradient, which would not be used to influence the calculations.

If the linear regression LR was greater than the upper threshold, then the value of the trend T could be set to be equal to the linear regression LR plus a first correction factor (e.g., 0.7), e.g., $$\text{If } LR > +0.3, \text{ then } T = LR + 0.7. \quad (7)$$

In this case there is a significant increase in values, leading to an expectation of a strong signal. This will deliver a value for the trend T between 1.0 and 1.7, though values close to the upper end are much less likely.

Finally, if the linear regression LR is less than the lower threshold, then the value for the trend T is set to be equal to the inverse value of the linear regression LR minus a second correction value (e.g., 0.3), e.g., $$\text{If } LR < -0.3, \text{ then } T = (LR \times -1) - 0.3. \tag{8}$$

In this case there is a significant decrease in values, leading to an expectation of a weak signal. This will deliver a value for the trend T between 0.0 and 0.7, though values close to the lower end are much less likely.

Once the trend T value is determined, it can be used to determine the probability of coverage $P_C$, according to equation (3) the determination of whether to pre-load data into the mobile device 110 can then be made based on a comparison of the probability of coverage $P_C$ to a threshold value. For example, one set of embodiments sets the threshold at 60%. If the probability of coverage $P_C$ is greater than 60% ($P_C > 60\%$), then there is no need to employ pre-loading operations. However, if the probability of coverage $P_C$ is less than 60% ($P_C < 60\%$), then it is necessary to preload data into the pre-loaded database 170 of the device application 160.

Since, according to this process, the value for the trend T can theoretically be over 1.0, the calculation for the product of the current predicted coverage value $V_C$ and the trend T (i.e., $V_C \times T$) can also return a value above 1.0. In such case, the value of this product can be capped at 1.0 such that the value of the probability of coverage $P_C$ will be between 0% and 100%.

D. Dynamic Determination of Pre-loaded Data

Once the system determines where the mobile device 110 is likely to be (i.e., the predicted coverage area 550, 650, 750), determines the probability of network coverage $P_C$ in that coverage area is, determines the predicted bandwidth in that coverage area is, and determines that it is necessary to pre-load some data, the system must then to determine what data to pre-load. Again, this process will be described with respect to an e-commerce application, but should not be considered limited to such. It is applicable to streaming audio/video applications, navigational applications, and any application for which continual data need be downloaded.

In the disclosed embodiments, the system maintains a working set of data that needs to be downloaded. In the case of an e-commerce application, this is a list of offers that could be passed on to the user 115 should their user profile data, their user movement history data, and their current location match the required criteria.

This means that the system has two location-based profile and location offer activities in operation:

First, the system is providing live and direct offers to the user 115 as she moves through the world.

Second, the system is continually trawling through a full set of available activities and offers, and selecting a working set of offers to pre-load into the mobile device 110 of the user 115.

The selection of both the live offers and the working set of offers can employ the same process that is implemented within an event-based system, and is continually calculated in real-time. In the case of streaming media (streaming audio and/or streaming video and the like), this relates to the amount of media that the application requires to pre-fetch to cover a likely loss in service.

Here, the system will know that the mobile device is likely in the future to be at a certain location (based on their speed, direction and each of their volatilities) at a certain time, and that the predicted radius is calculated from their direction volatility and the forecast time (as further discussed in connection with FIG. 5).

The calculations for what to actually pre-download may depend on each specific application. For the following two exemplary applications of eCommerce and streaming music, this is how they would be implemented:

eCommerce

In one set of embodiments, the amount of data preloaded can be dependent upon the probability of coverage $P_C$, with a higher probability of coverage $P_C$ meaning less data is stored, and with a lower probability of coverage $P_C$ meaning more data is stored. One way to implement this is to inversely vary the radius of uncertainty $R_U$ based on the probability of coverage $P_C$. A particular implementation could have the radius of uncertainty $R_U$ multiplied by 100 minus the ability of coverage $P_C$:

$$\text{Modified } R_U = \text{Original } R_U \times (100 - P_C). \tag{9}$$

In this way, when the probability of coverage $P_C$ is 100%, the radius of uncertainty $R_U$ will be zero, and the predicted coverage area will be nonexistent. Likewise, when the probability of coverage $P_C$ is 0%, the radius of uncertainty $R_U$ will be at its maximum value, and contain the maximum number of locations of interest. Intermediate values of the probability of coverage $P_C$ will result in intermediate values of a modified radius of uncertainty $R_U$. In one particular set of embodiments, the threshold can be set to 60%.

Most of the profile matching aspects may have already been computed on a merchant's server, as they have already been filtered and focused for the specific customer. However, it is possible for the device application 170 to perform further profile analysis, for example to ensure that their profile has not changed or to confirm some historical activity. The customer's location can be a primary feed for triggering, and this can be achieved with no network coverage using GPS or pre-loaded maps of known or Wi-Fi hotspots or iBeacons and their locations, or some other technique. This means that the device application 170 can continuously, and in real time, determine what of the pre-loaded data is relevant to the current location of the mobile device 110, and the profile of the user 115 without the need for a network connection.

For each offer, it is possible to set up a location-based trigger with the properties:

offer details, offer location and area, and offer profile data.

An offer is matched directly when:

the current location of the mobile device 110 is within the offer location/area and the profile data of the user 115 matches the offer profile data.

An offer is pre-loaded into the pre-loaded database 170 when:

the predicted coverage zone 550, 650, 750 covers the offer location/area and the profile data of the user 115 matches the offer profile data.

An offer is removed from the pre-loaded database 170 when:

the predicted coverage zone 550, 650, 750 moves away from the offer location/area or the profile data of the user 115 does not match the offer profile data.

This process will typically be continuous. In other words, users can be continually provided with a set of dynamic offers as they move about.

Streaming Music

Calculations are slightly different for streaming audio/video. In this type of application, it is desirable to determine an amount to buffer in the mobile device 110. However, the determination of whether to pre-load (that is, buffer) audio/video data is performed by comparing the probability of coverage $P_C$ with a set threshold. If the probability of coverage $P_C$ is above the threshold, then it is determined that there is no need to pre-load any audio/video data. If, however, the probability of coverage $P_C$ is below the threshold, then it is necessary to set an appropriate buffering amount (that is, buffering time) to pre-load into the database of pre-loaded data 170.

The required amount of buffer data can likewise be determined based on the inverse of the probability of coverage $P_C$ multiplied by a maximum buffer time $T_M$ needed for the entirety of the next time interval before a new determination is made:

$$\text{Buffer Amount} = \frac{T_M \times (100 - P_C)}{100}. \tag{10}$$

In each of these situations, the threshold can be a fixed number, or a variable number. In the case of the threshold being a variable number, it could vary based on any desirable parameter. One particular set of embodiments could vary the threshold based on the overall volatility of the network 175.

E. Real-Time Provision of Network Coverage

Figure 8:
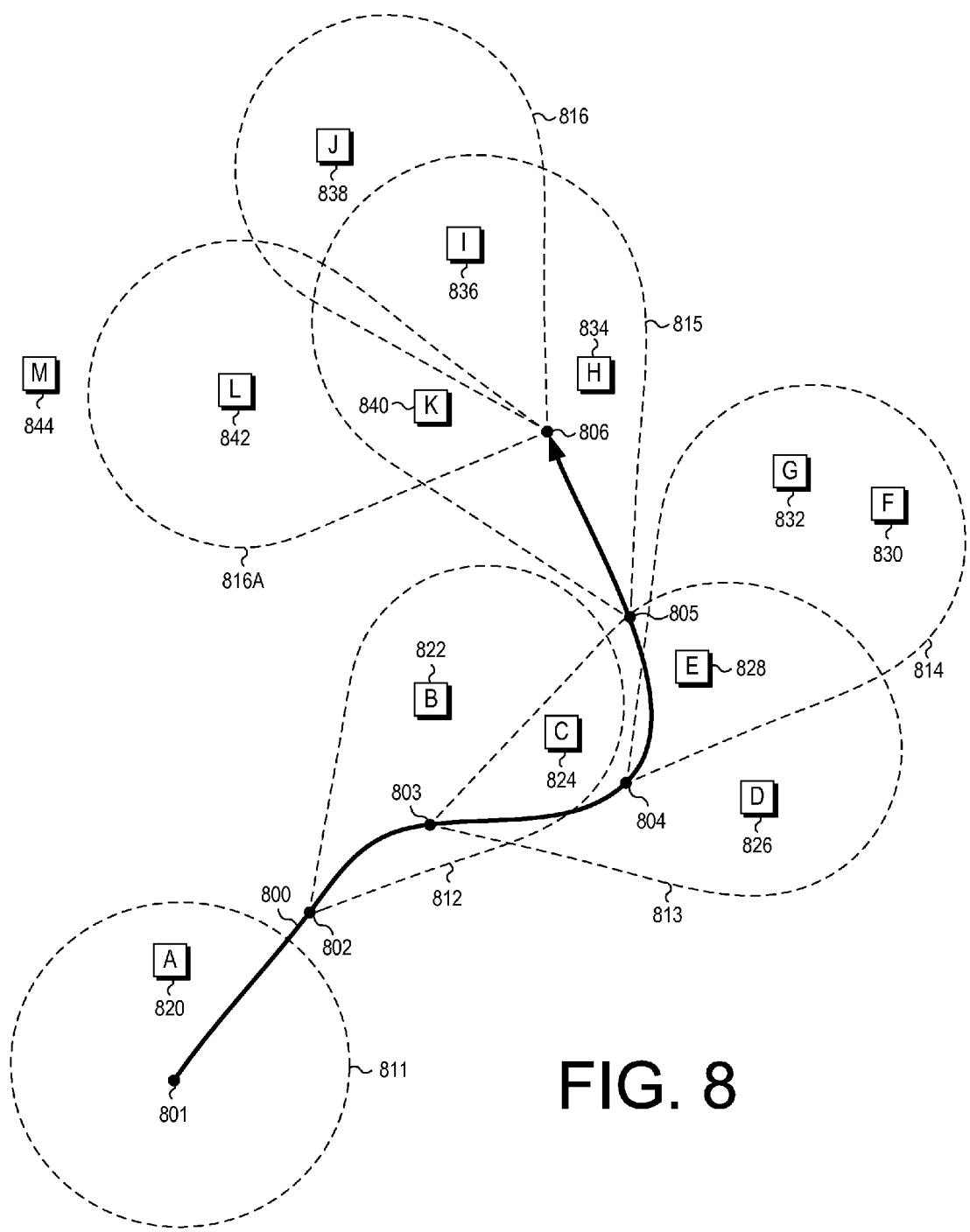
FIG. 8 is a diagram illustrating how multiple coverage areas are predicted as a mobile device moves along a path according to disclosed embodiments.

FIG. 8 is a diagram illustrating how multiple coverage areas are predicted as a mobile device moves along a path according to disclosed embodiments. This exemplary embodiment will be described with reference to an e-commerce mobile device application for simplicity of disclosure. However, it should be understood that the system and method disclosed in FIG. 8 is equally applicable to other embodiments, such as streaming audio/video applications, navigational applications, or any application that requires a continual supply of data.

This example follows a user 115 and her mobile device 110 as she starts at a first location 801, passes through second through fifth locations 802-805, and ends at a sixth location 806. At each location 801-806, the system determines a predicted coverage area that it expects the mobile device 110 to be in after a particular time interval. This time interval may be a fixed time interval or a variable time interval. Regardless, the relevant time interval is known to the system prior to determining each predicted coverage area.

The user 115 and her mobile device 110 begin at location 801, where the mobile device 110 has not moved at all for the previous N time intervals. As a result, both the average speed $S_A$ of the mobile device and the predicted movement distance $D_M$ will be zero. Therefore, the first predicted coverage area 811 is defined entirely by the radius of uncertainty $R_U$. In this situation, even though the mobile device 110 has not moved for the previous N time intervals, a certain minimal value is provided for directional volatility DV, and therefore for the radius of uncertainty $R_U$.

At this point in time, the system predicts a probability of network coverage within the first coverage area 811 during the next time interval, and a predicted available bandwidth for the first coverage area 811 during the next time interval. If there is a sufficiently high probability of network coverage, and a sufficiently high predicted available bandwidth, then the system performs no pre-loading action.

If, however, there is either a probability of network coverage lower than a set coverage threshold, or the predicted available bandwidth is lower than a set bandwidth threshold, then the system will pre-load some data into the mobile device 110, against the possibility that it will be unable to do so in the near future.

In order to determine what data to pre-load, the system looks to see what relevant stores there are in the first predicted coverage area 811. It does so by examining the profile of the user 115 stored in the user database 140 in the central server 105. In this example, the system discovers that store A 820 is within the first predicted coverage area 811, and that the user 115 associated with the mobile device 110 has a relationship with store A 820. The system then determines whether there are any offers from store A 820 that need to be pre-loaded. If there are, the system preloads the relevant data into the pre-loaded database 170 in the device application 160.

After a first time interval, the system determines a new predicted coverage area that reflects the computed value for the new radius of uncertainty $R_U$. At this point in time, the mobile device 110 has moved from the first location 801 to the second location 802. Now, the movement data for the previous N time intervals includes some actual movement. As a result, the values for the average speed $S_A$ and predicted movement distance $D_M$ are nonzero, there is a predicted movement direction, and the value for the directional volatility DV is other than the default value. Based on the values of these variables, the system determines a second predicted coverage area 812, as described above with respect to FIG. 5.

At this point in time the system predicts a probability of network coverage within the second coverage area 812 during the next time interval, and a predicted available bandwidth for the second coverage area 812 during the next time interval. If there is a sufficiently low probability of network coverage, and a sufficiently high predicted available bandwidth, then the system performs no pre-loading action.

If, however, there is either a probability of network coverage lower than a set coverage threshold, or the predicted available bandwidth is lower than a set bandwidth threshold, then the system will pre-load some data into the mobile device 110, against the possibility that it will be unable to do so in the near future.

In order to determine what data to pre-load, the system looks to see what relevant stores there are in the second predicted coverage area 812. It does so by examining the profile data and movement history data of the user 115 stored in the user database 140 in the central server 105. In this example, the system discovers that store B 822 and store C 824 are both within the second predicted coverage area 812. The system then determines that the user 115 associated with the mobile device 110 has a relationship with store C 824, but not with store B 822. As a result of this determination, the system further determines whether there are any offers from store C 824 that need to be pre-loaded. It does not make this determination with respect to store B 822 because the profile data for the user 115 does not indicate that there is a relationship between the user 115 and the store B 822. However, if the system determines that there are any relevant offers from store C 824, it pre-loads the relevant data into the pre-loaded database 170 in the device application 160.

After a second time interval, the system determines a new predicted coverage area that reflects the computed value for the new radius of uncertainty $R_U$. At this point in time, the mobile device 110 has moved from the second location 802 to the third location 803. The system then determines a third predicted coverage area 813, as well as a probability of network coverage and a predicted bandwidth for the third predicted coverage area 813 in the next time period.

If there is either a probability of network coverage lower than a set coverage threshold, or the predicted available bandwidth is lower than a set bandwidth threshold, then the system will pre-load some data into the mobile device 110, against the possibility that it will be unable to do so in the near future. In this case, the system determines that store C 824, store D 826, and store E 828 are all within the third predicted coverage area 813. Furthermore, the system determines that the user 115 has a relationship with store C 824 and has frequently visited store D 826, but has no relationship with store E 828. Therefore, the system either retains the pre-loaded offer data for store C 824 (if it has not changed), or pre-loads new offer data for store C 824 (if it has changed), and pre-loads offer data for store D 826. No offer data need be loaded for store E 828 because the user 115 has no relationship with store E 828.

After a third time interval, the system determines a new predicted coverage area that reflects the computed value for the new radius of uncertainty $R_U$. At this point in time, the mobile device 110 has moved from the third location 803 to the fourth location 804. Therefore, the system determines a fourth predicted coverage area 814, as well as a probability of network coverage and a predicted bandwidth for the fourth predicted coverage area 814 in the next time period.

If there is either a probability of network coverage lower than a set coverage threshold, or the predicted available bandwidth is lower than a set bandwidth threshold, then the system will pre-load some data into the mobile device 110, against the possibility that it will be unable to do so in the near future. In this case, the system pre-loads offer data with respect to store F 830 and store G 832 based on the user profile data and the user movement history data.

After a fourth time interval, the system determines a new predicted coverage area that reflects the computed value for the new radius of uncertainty $R_U$. At this point in time, the mobile device 110 has moved from the fourth location 804 to the fifth location 805. Therefore, the system determines a fifth predicted coverage area 815, as well as a probability of network coverage and a predicted bandwidth for the fifth predicted coverage area 815 in the next time period.

If there is either a probability of network coverage lower than a set coverage threshold, or the predicted available bandwidth is lower than a set bandwidth threshold, then the system will pre-load some data into the mobile device 110, against the possibility that it will be unable to do so in the near future. In this case, the system determines that the probability of network coverage is greater than the set coverage threshold, and does not preload any offer data, despite the fact that store H 834, store I 836, and store K 840 are in the fifth predicted coverage area 815.

After a fifth time interval, the system determines a new predicted coverage area that reflects the computed value for the new radius of uncertainty $R_U$. At this point in time, the mobile device 110 has moved from the fifth location 805 to the sixth location 806. Therefore, the system determines a sixth predicted coverage area 816. However, in this situation, the sixth predicted coverage area 816, is calculated based only on the movement variables noted in equations (1) and (2). But the user movement history data shows that at this time of day, on this day of the week, the mobile device 110 is frequently at the location of store L 842 (e.g., this may be a Saturday morning, and store L 842 may be the supermarket where the user 115 does her weekly shopping).

Based on this user movement history data, the system alters the sixth predicted coverage area 816 to a modified sixth predicted coverage area 816A, in which the ending location 520 is set to be the location of store L 840. This is because even though the user movement data from the immediately prior time intervals indicates that the mobile device 110 is heading in the direction of store I 836, and store J 838, user movement data from prior days indicates a likelihood that the user 115 is heading in the direction of store L 842.

Therefore, the system uses the modified sixth predicted coverage area 816A for its determination of probability of network coverage and available bandwidth in the next time interval, and the determination as to whether there is a need to pre-load any offer data into the mobile device 110. Based on this, the system loads offer data for store K 840 and store L 842. No data is pre-loaded for store M 844, even though the mobile device 110 is headed in the direction of store M 844. This is because store M 844 is not within the modified sixth predicted coverage area 816A. Furthermore, it is possible that the data with respect to store I 836 will remain in the database of pre-loaded offers 260, despite store I 836 not being within the modified sixth predicted coverage area 816A. To the extent that there is space available in the database of pre-loaded offers 260, the offer data with respect to store I 836 can be retained. However, it will not be updated.

This process will continue indefinitely, with the system monitoring the movements of the mobile device 110, and continually predicting a new coverage area.

Offer Execution

As shown in FIG. 8, when the user 115 (with or without network access) enters a zone of interest and their device application 160 identifies a suitable offer, that offer is then displayed on the user's mobile device 110. The user 115 can then decide whether or not to execute that offer with the retailer. To do this, the user 115 can be required to provide a small, but unique, code to the retailer. These codes can be pre-computed and combined with in the offer detail sent to the device application 160. Furthermore, the offer, once shown to the user 115 is typically limited in time for a fixed amount of time. At the checkout within the retail store, the code is scanned and (since the store should have reliable network access) is confirmed as valid for the offer to be approved.

Once the device application 160 is reconnected to the central server 105 after a disconnection, the working set of offers is updated, and any executed offers are recorded.

It should be noted, that the predicted coverage areas 811-816 and 816A are not necessarily the same size or shape. The size and shape of each of these predicted coverage areas 811-816 and 816A depend upon the variables noted above. Since these variables will not necessarily be the same at each time interval, the shapes of the predicted coverage areas 811-816 and 816A may vary with respect to each other.

IV. Example Implementation(s)

An example implementation is now discussed, in connection with the example overall architecture of the system for dynamically providing real-time service for a mobile device in a distributed wireless network illustrated in FIG. 1, which was outlined above.

The implementation of the logic can exist within both the remote server and vendor's own smart phone "app" that will be resident within each customer's smart phone. Both can have access to information sources that include:

—The Location of Each Customer. This can be sourced from the app itself and can use a range of different technologies (GPS, Cell Tower triangulation, Wifi Zones, iBeacons, and the like). The generation of an absolute set of coordinates from these can occur directly, without processing (in the case of OPS), or though computation in conjunction with the server (in the case of the others)—though in these cases it may be possible to pre-load the data sets for the app itself to perform the location calculations (for example, the UUID's and locations of any nearby iBeacons).

—The Profile of the Customers. This can be resident in both the server (for all customers) and the app (for each customer)—and can be continually synchronized when there is network coverage.

—The Offers Themselves. Most offers will be related to one or more of: location, profile matching and time aspects. The server can hold all offers for all customers, whereas each app can cache only those offers deemed relevant for each customer.

The behavior can be split into predicting the possible set of offers and when they will be needed and then, secondly, executing those offers, with and without network coverage.

Features include predicting the set of possible offers and/or deciding exactly when they are needed.

A. Integrated Operation

Figure 9:
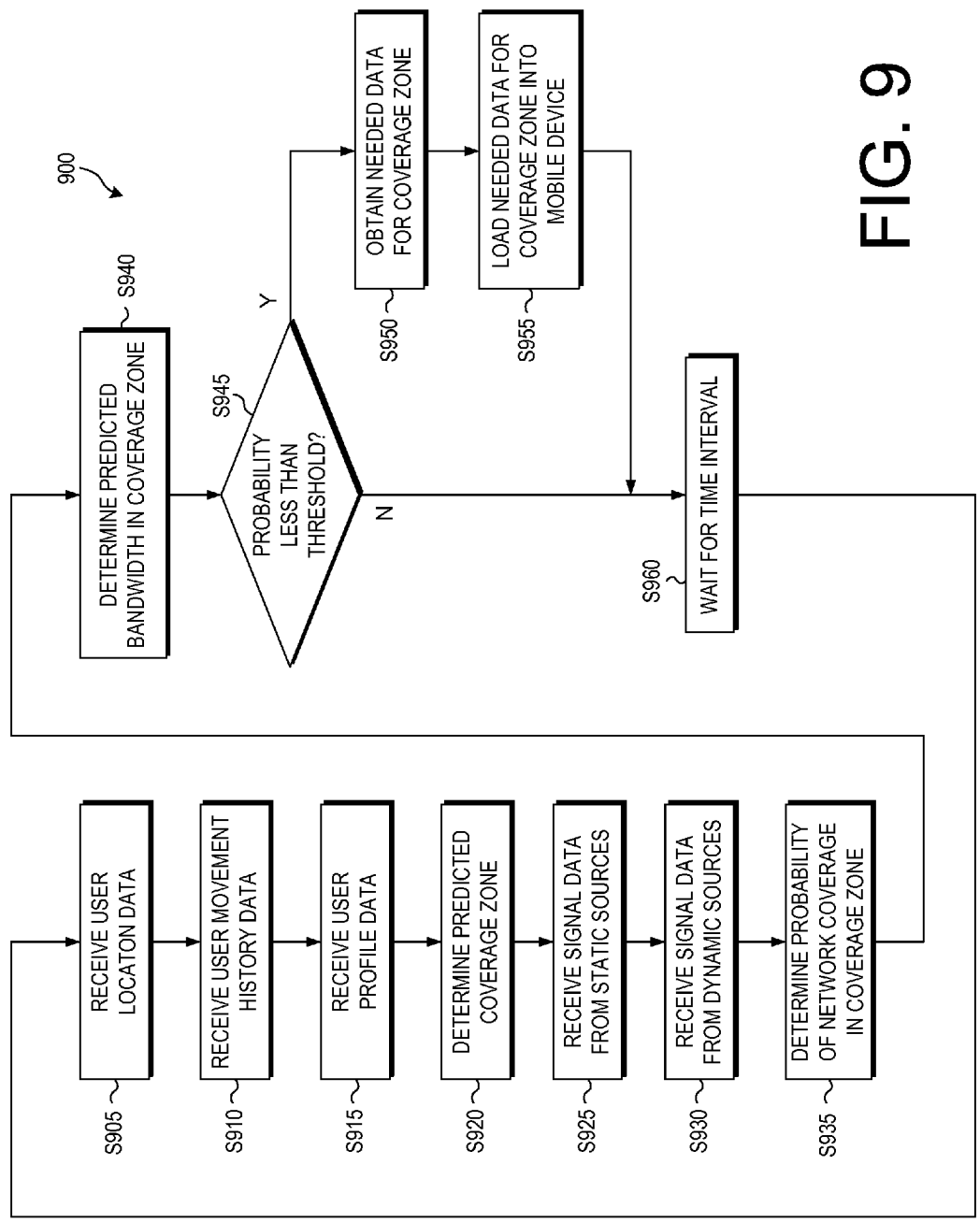
FIG. 9 is a flow chart showing an operation of providing continued streaming content to a mobile device in a distributed wireless network according to disclosed embodiments.

FIG. 9 is a flow chart showing an operation 900 of providing continued streaming content to a mobile device in a distributed wireless network according to disclosed embodiments. This shows an integrated operation of the method and system described above. For ease of disclosure, it will be assumed that the mobile device 110 performs the operations in FIG. 9. However, it is possible that some or all of these operations will be performed at the central server 105.

As shown in FIG. 9, the operation 900 begins when the mobile device 110 receives user location data S905. This can be via a GPS signal, network signal triangulation or any similar method of identifying the location of the mobile device 110.

The mobile device 110 then receives user movement history data S910, and user profile data S915 from the user database 140 in the central server 105.

Based on the user movement history data and the user profile data, the mobile device 110 then determines a predicted coverage zone S920, as described above. This predicted coverage zone may be based largely on the movement history data, or may be influenced by the profile of the user 115, quite apart from what the user movement history data shows.

The mobile device 110 then receives signal data from static sources S925 and from dynamic sources S930. The static sources can be service coverage maps, and the dynamic sources can be actual measurements of signal strength and available bandwidth from the mobile device 110 and other mobile devices near the mobile device 110.

The mobile device 110 then determines a probability of network coverage in the coverage zone during the next time interval S935, and a predicted bandwidth in the coverage zone during the next time interval S940. Then the mobile device 110 compares the probability of network coverage in the coverage zone with a threshold value.

If the probability of network coverage in the coverage zone is less than a threshold value, then the mobile device 110 obtains the data needed for the coverage zone S950, and loads the needed data for the coverage zone into the mobile device 110 S955. Then, the mobile device 110 waits for a time interval S960 until it receives new user location data S905.

If, however, the probability of network coverage and a coverage zone is greater than the threshold value, the mobile device 110 determines that no pre-loading is required, and it simply waits for the time interval S960 until it receives new user location data S905.

B. Identifying a Coverage Zone

Figure 10:
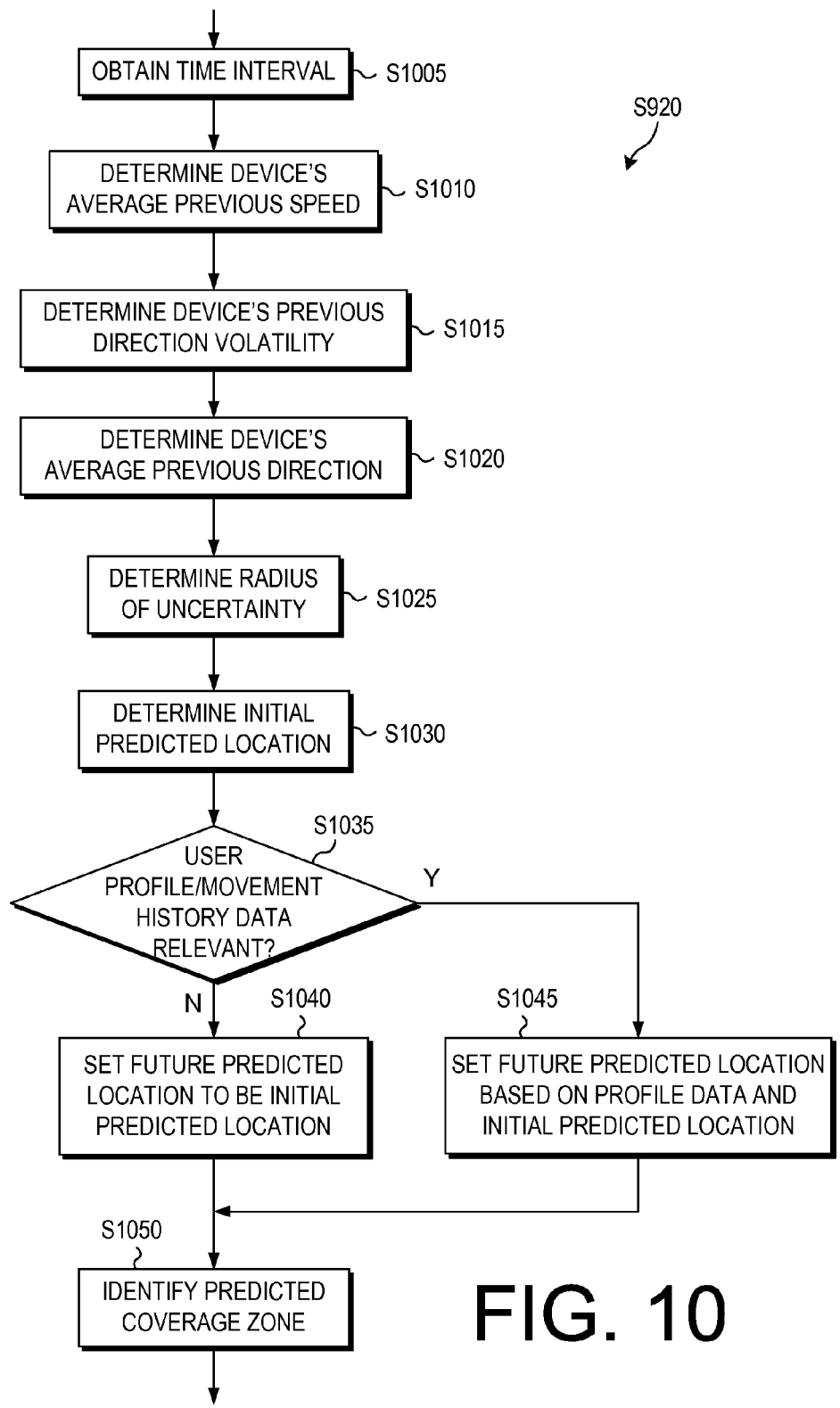
FIG. 10 is a flow chart showing an operation of predicting a coverage zone according to disclosed embodiments.

FIG. 10 is a flow chart showing an operation of predicting a coverage zone S920 according to disclosed embodiments. For ease of disclosure, it will be assumed that the mobile device 110 performs the operations in FIG. 10 as shown in FIG. 10. However, it is possible that some or all of these operations will be performed at the central server 105.

As shown in FIG. 10, operation begins when the mobile device 110 obtains a time interval S1005. It may receive this time interval from the central server 105, may generate this time interval itself, or may have the time interval stored as a fixed value.

Next, the mobile device 110 determines the average previous speed of the mobile device 110 S1010, the previous direction volatility of the mobile device 110 S1015, and the average previous direction of the mobile device 110 S1020. It makes these determinations based on the user movement history data received in operation S910.

Then, based on the device's average previous speed, the device's previous direction volatility, and the device's average previous direction, the mobile device 110 determines a radius of uncertainty S1025 that will be used to identify a predicted coverage zone.

Next, also based on the device's average previous speed, the device's previous direction volatility, and the device's average previous direction, the mobile device 110 determines an initial predicted location S1030. This initial predicted location identifies where the mobile device 110 is likely to be if it continues moving according to the manner in which it has previously moved.

However, as noted above, the movements of the user 115 may be influenced by other factors. In particular, users have habits, preferences, and routines. These can be predicted by looking at the user movement history data received in operation S910, and the user profile data received in operation S915. Therefore, the mobile device 110 determines whether any of the user profile/movement history data is relevant to the current determination of a future predicted location S1035. This can involve looking at what locations have stores for which the user 115 is a member of the loyalty club, looking at previous movement habits of the user 115, shops that the user 115 has bought from online, etc.

If the mobile device 110 determines that none of the user profile/movement history data is relevant to the current initial predicted location, then the mobile device 110 sets a future predicted location to be equal to the initial predicted location S1040.

If, however, the mobile device 110 determines that some of the user profile/movement history data is relevant to the current initial predicted location, it sets a future predicted location based on both the profile/movement history data and the initial predicted location S1045.

Finally, using the future predicted location set in either operation S1040 or operation S1045, the mobile device 110 identifies the predicted coverage zone S1050.

The central server 105 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The server controller 120, application database 135, user database 140, a disk drive and/or removable storage medium are referred to as "computer-readable storage media" and provide non-transitory storage of computer programs and data.

It should be understood that FIGS. 1-4 are described in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

V. Glossary

Terms as used herein are intended to be interpreted first, as understood to one of skill in the art of mobile networks; and if not interpretable in the art of mobile networks, then as understood to one of skill in the art of computer science and information science; and then if not so interpretable, according to a more general dictionary.

The claims may use the following terms, which are defined to have the following meanings for the purpose of the claims herein. Other definitions may be specified in this document.

The term "application," sometimes referred to as an "app," is used herein to denote a computer program stored on a mobile device that performs a specific function.

The term "central server" is used herein to denote a remote machine or machines that run the coordination and server-side application logic for the system and network disclosed above.

The term "customer" is sometimes used herein to refer to an active customer of a vendor/retailer.

The term "direction volatility" is used herein to denote an indication of how uniform a path of movement has been over a set period of time. Movement in a straight line will result in a lower volatility, whereas random meandering will result in a higher volatility.

The term "iBeacon" is used herein to denote a short distance location-sensing technology.

The term "mobile device" used herein denotes a device sometimes referred to as a computer, laptop, personal computer, tablet computer, handheld computer, smart phone, personal digital assistant, notebook computer, personal assignment pad, or evolutions and equivalents thereof.

The term "predicted coverage area" is used herein to denote an area in which a mobile device is predicted to move in a given time interval.

The term "network outage" is used herein to denote a circumstance in which a mobile device is unable to contact a central server of the network.

The designation "remote server" is used herein to denote a remote machine(s) that runs the coordination and server side application logic.

The term "user" is used herein to denote the owner of a mobile device and, in the case of an e-commerce application, an active customer of a vendor/retailer.

The term "working set of offers" is used herein to denote a small set of possible offers that could be shown to a user if the user's location and profile match, even without a network connection.

VI. Implementations and Technical Notes

The above discussion has assumed that the reader has a sufficient background for appreciating the points made. This section provides some supplementary implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed showing a single mobile device. An embodiment may be used by numerous mobile devices, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for dynamic and real-time mobile service assurances, for example, in areas of poor network coverage, through predicting and pre-caching data, have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The system used in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for information delivery.

One or more databases implicated by the above discussion may be, by way of example but not limitation, in a relational database format, but other standard data formats may also be used. Optionally, the various databases may include a known conversion system capable of receiving data in various standard formats.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for dynamically providing real-time service for a mobile device in a distributed wireless network, comprising:
   receiving user location data;
   receiving user movement history data;
   receiving user profile data;
   determining a predicted coverage area based on the user location data and at least one of: the user movement history data and the user profile data;
   receiving static coverage data for the predicted coverage area;
   receiving dynamic signal data for the predicted coverage area;
   determining a predicted probability of network failure in the predicted coverage area based on the static coverage data and the dynamic signal data;
   determining when the predicted probability exceeds a set threshold value;
   retrieving desirable data for the predicted coverage area when the predicted probability exceeds a set threshold value; and
   storing the desirable data in a computer memory in the mobile device when the predicted probability exceeds the set threshold value,
   wherein the predicted coverage area has a teardrop shape whose pointed end is at a current location of the mobile device,
   the user movement history data includes a previous average direction the mobile device moved over a previous time interval, a previous average speed of the mobile device over the previous time interval, and the previous direction volatility of the mobile device over the previous time interval, and
   the operation of determining a predicted future location includes:
      identifying an initial future location based on the future time interval, the previous average direction, the previous average speed, and the direction volatility of the mobile device; and
   modifying the initial future location to obtain the predicted future location based on the user profile data.

2. The method of claim 1, wherein a size of data packages sent to the mobile device is determined based on the predicted probability of network failure.

3. The method of claim 1, further comprising:
   determining a network failure trend value in the predicted coverage area, the network failure trend value indicating a movement trend of the predicted probability over time.

4. The method of claim 1, wherein the user profile information includes one or more pieces of location data and day/time data associated with each of the one or more pieces of location data.

5. The method of claim 1, wherein the dynamic signal data includes at least one of: a current signal strength measurement for the mobile device, a bandwidth measurement for the mobile device, current signal strength measurements for one or more nearby users in the predicted coverage zone, and current bandwidth measurements for the one or more nearby users.

6. The method of claim 1, wherein the operation of determining the predicted coverage area includes:
obtaining a future time interval;
determining a predicted future direction of the mobile device during the future time interval based on the user movement history data;
determining a predicted future location of the mobile device after the future time interval has elapsed based on the user location data, the user movement history data, the predicted future direction, the future time interval, and the user profile data;
determining a radius of uncertainty around the predicted future location based on the user movement history data and the future time interval; and
identifying the predicted coverage area based on the user location data, the predicted future location, the radius of uncertainty.

7. The method of claim 1, further comprising:
periodically repeating the operations of receiving user location data, receiving user movement history data, receiving user profile data, determining a predicted coverage area, receiving static coverage data, receiving dynamic signal data, determining a predicted probability of network failure, determining when the predicted probability exceeds a set threshold value, retrieving desirable data, and storing the desirable data.

8. A system for dynamically providing real-time service for a mobile device in a distributed wireless network, comprising:
a memory; and
a processor cooperatively operable with the memory, and configured to, based on instructions stored in the memory,
receive user location data;
receive user movement history data;
receive user profile data;
determine a predicted coverage area based on the user location data and at least one of: the user movement history data and the user profile data;
receive static coverage data for the predicted coverage area;
receive dynamic signal data for the predicted coverage area;
determine a predicted probability of network failure in the predicted coverage area based on the static coverage data and the dynamic signal data;
determine when the predicted probability exceeds a set threshold value;
retrieve desirable data for the predicted coverage area when the predicted probability exceeds a set threshold value; and
store the desirable data in the memory when the predicted probability exceeds the set threshold value,
wherein the predicted coverage area has a teardrop shape whose pointed end is at a current location of the mobile device,
the user movement history data includes a previous average direction the mobile device moved over a previous time interval, a previous average speed of the mobile device over the previous time interval, and the previous direction volatility of the mobile device over the previous time interval,
during the operation of determining the predicted future location, the processor is further configured to:
identify an initial future location based on the future time interval, the previous average direction, the previous average speed, and the direction volatility of the mobile device; and
modify the initial future location to obtain the predicted future location based on the user profile data.

9. The system of claim 8, wherein a size of data packages sent to the mobile device is determined based on the predicted probability of network failure.

10. The system of claim 8, wherein the user profile data information includes one or more pieces of location data and day/time data associated with each of the one or more pieces of location data.

11. The system of claim 8, wherein the dynamic signal data includes at least one of: a current signal strength measurement for the mobile device, a bandwidth measurement for the mobile device, current signal strength measurements for one or more nearby users in the predicted coverage zone, and current bandwidth measurements for the one or more nearby users.

12. The system of claim 8, wherein during the operation of determining the predicted coverage area, the processor is further configured to:
obtain a future time interval;
determine a predicted future direction of the mobile device during the future time interval based on the user movement history data;
determine a predicted future location of the mobile device after the future time interval has elapsed based on the user location data, the user movement history data, the predicted future direction, the future time interval, and the user profile data;
determine a radius of uncertainty around the predicted future location based on the user movement history data and the future time interval; and
identify the predicted coverage area based on the user location data, the predicted future location, the radius of uncertainty.

13. A non-transitory computer-readable medium comprising executable instructions for a method for dynamically providing real-time service for a mobile device in a distributed wireless network, the instructions being executed to perform:
receiving user location data;
receiving user movement history data;
receiving user profile data;
determining a predicted coverage area based on the user location data and at least one of: the user movement history data and the user profile data;
receiving static coverage data for the predicted coverage area;
receiving dynamic signal data for the predicted coverage area;
determining a predicted probability of network failure in the predicted coverage area based on the static coverage data and the dynamic signal data;
determining when the predicted probability exceeds a set threshold value;
retrieving desirable data for the predicted coverage area when the predicted probability exceeds a set threshold value; and storing the desirable data in a computer memory in the mobile device when the predicted probability exceeds the set threshold value, wherein the predicted coverage area has a teardrop shape whose pointed end is at a current location of the mobile device, the user movement history data includes a previous average direction the mobile device moved over a previous time interval, a previous average speed of the mobile device over the previous time interval, and the previous direction volatility of the mobile device over the previous time interval, and the operation of determining a predicted future location includes:

identifying an initial future location based on the future time interval, the previous average direction, the previous average speed, and the direction volatility of the mobile device; and modifying the initial future location to obtain the predicted future location based on the user profile data.

14. The non-transitory computer-readable medium of claim 13, wherein a size of data packages sent to the mobile device is determined based on the predicted probability of network failure.

15. The non-transitory computer-readable medium of claim 13, wherein the user profile information includes one or more pieces of location data and day/time data associated with each of the one or more pieces of location data.

16. The non-transitory computer-readable medium of claim 13, wherein the dynamic signal data includes at least one of: a current signal strength measurement for the mobile device, a bandwidth measurement for the mobile device, current signal strength measurements for one or more nearby users in the predicted coverage zone, and current bandwidth measurements for the one or more nearby users.

17. The non-transitory computer-readable medium of claim 13, wherein the operation of determining the predicted coverage area includes:

obtaining a future time interval;

determining a predicted future direction of the mobile device during the future time interval based on the user movement history data;

determining a predicted future location of the mobile device after the future time interval has elapsed based on the user location data, the user movement history data, the predicted future direction, the future time interval, and the user profile data;

determining a radius of uncertainty around the predicted future location based on the user movement history data and the future time interval;

identifying the predicted coverage area based on the user location data, the predicted future location, the radius of uncertainty.

* * * * *